US011582040B2

(12) United States Patent
Soundararajan et al.

(10) Patent No.: US 11,582,040 B2
(45) Date of Patent: Feb. 14, 2023

(54) PERMISSIONS FROM ENTITIES TO ACCESS INFORMATION

(71) Applicant: Hewlett Packard Enterprise Development LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 16/757,703

(22) PCT Filed: Oct. 20, 2017

(86) PCT No.: PCT/US2017/057558
§ 371 (c)(1),
(2) Date: Apr. 20, 2020

(87) PCT Pub. No.: WO2019/078879
PCT Pub. Date: Apr. 25, 2019

(65) Prior Publication Data
US 2021/0203503 A1 Jul. 1, 2021

(51) Int. Cl.
*H04L 9/32* (2006.01)
*H04L 9/08* (2006.01)
(Continued)

(52) U.S. Cl.
CPC .......... *H04L 9/3213* (2013.01); *H04L 9/0825* (2013.01); *H04L 9/0894* (2013.01);
(Continued)

(58) Field of Classification Search
CPC ... H04L 9/3213; H04L 9/0825; H04L 9/0894; H04L 9/3247; H04L 2209/38;
(Continued)

(56) References Cited

U.S. PATENT DOCUMENTS 8,042,163 B1 10/2011 Karr et al.
8,793,509 B1 7/2014 Nelson et al.
(Continued)

FOREIGN PATENT DOCUMENTS

CN 103051630 A 4/2013
CN 105659558 A 6/2016
(Continued)

OTHER PUBLICATIONS

Extended European Search Report Received for EP Patent Application No. 17928996.2, dated May 4, 2021, 9 pages.
(Continued)

*Primary Examiner* — Darren B Schwartz
(74) *Attorney, Agent, or Firm* — Trop, Pruner & Hu, P.C.

(57) ABSTRACT

In some examples, in response to a request from a client device for information relating to a transaction stored by a blockchain, a system identifies, using information stored in a distributed storage system that stores data for the blockchain, multiple data owner entities from which permissions are to be obtained for access of the information, and determines an authorization requirement for the information based on a smart contract. The system sends authorization information based on the authorization requirement to trigger a retrieval of authorization tokens from the identified data owner entities for access of the information, and sends the information to the client device in response to receiving the authorization tokens.

21 Claims, 4 Drawing Sheets

(51) Int. Cl.
  *G06F 21/62* (2013.01)
  *G06F 21/64* (2013.01)
  *H04L 9/40* (2022.01)
  *H04L 67/1097* (2022.01)
  *H04L 9/00* (2022.01)

(52) U.S. Cl.
  CPC .............. *H04L 9/3247* (2013.01); *H04L 9/50* (2022.05); *H04L 2209/56* (2013.01)

(58) Field of Classification Search
  CPC . H04L 2209/56; H04L 9/3226; H04L 9/3234; H04L 9/3239; H04L 63/10; H04L 67/1097; G06F 21/6218; G06F 2221/2141; G06F 21/64
  See application file for complete search history.

(56) References Cited

U.S. PATENT DOCUMENTS

| | | | |
|---|---|---|---|
| 9,569,771 | B2 | 2/2017 | Lesavich et al. |
| 9,635,000 | B1 | 4/2017 | Muftic |
| 9,648,007 | B1 | 5/2017 | Sterling et al. |
| 9,722,790 | B2 | 8/2017 | Ebrahimi |
| 9,980,137 | B2 | 5/2018 | South et al. |
| 10,194,320 | B1 | 1/2019 | Egner et al. |
| 11,226,956 | B2 | 1/2022 | Somani et al. |
| 2005/0015591 | A1* | 1/2005 | Thrash ................ G06F 21/6218 713/166 |
| 2006/0236382 | A1 | 10/2006 | Hinton et al. |
| 2012/0150750 | A1 | 6/2012 | Law et al. |
| 2013/0104211 | A1 | 4/2013 | Nandakumar |
| 2013/0333009 | A1 | 12/2013 | Mackler |
| 2014/0059213 | A1 | 2/2014 | Ollikainen et al. |
| 2014/0215594 | A1 | 7/2014 | Lambert |
| 2014/0380040 | A1* | 12/2014 | Albahdal ............ H04L 63/0861 713/155 |
| 2016/0055322 | A1 | 2/2016 | Thomas |
| 2016/0088424 | A1 | 3/2016 | Polo et al. |
| 2016/0342989 | A1 | 11/2016 | Davis |
| 2017/0076306 | A1 | 3/2017 | Snider et al. |
| 2017/0091397 | A1* | 3/2017 | Shah ..................... G06Q 50/01 |
| 2017/0132619 | A1 | 5/2017 | Miller et al. |
| 2017/0132620 | A1 | 5/2017 | Miller et al. |
| 2017/0132625 | A1 | 5/2017 | Kennedy |
| 2017/0132630 | A1 | 5/2017 | Castinado et al. |
| 2017/0134429 | A1* | 5/2017 | Gustafsson ........... H04L 63/062 |
| 2017/0163733 | A1 | 6/2017 | Grefen et al. |
| 2017/0177898 | A1 | 6/2017 | Dillenberger |
| 2017/0228371 | A1 | 8/2017 | Seger, II |
| 2017/0230375 | A1* | 8/2017 | Kurian .................. H04L 63/102 |
| 2017/0230791 | A1 | 8/2017 | Jones |
| 2017/0232300 | A1 | 8/2017 | Tran et al. |
| 2017/0236123 | A1 | 8/2017 | Ali et al. |
| 2017/0243208 | A1 | 8/2017 | Kurian et al. |
| 2017/0262902 | A1 | 9/2017 | Weston et al. |
| 2017/0302450 | A1 | 10/2017 | Ebrahimi |
| 2017/0330174 | A1* | 11/2017 | Demarinis .............. G06F 21/62 |
| 2018/0060496 | A1* | 3/2018 | Bulleit .................. H04L 9/3239 |
| 2018/0174122 | A1* | 6/2018 | Mattingly ............ G06Q 20/223 |
| 2018/0182052 | A1* | 6/2018 | Panagos ................ G06F 21/604 |
| 2018/0316502 | A1 | 11/2018 | Nadeau et al. |
| 2018/0337771 | A1* | 11/2018 | Baker .................. H04L 9/3236 |
| 2018/0349572 | A1* | 12/2018 | Chen ...................... G06Q 30/06 |
| 2019/0081796 | A1 | 3/2019 | Chow et al. |
| 2019/0140822 | A1 | 5/2019 | Xie et al. |
| 2019/0215162 | A1 | 7/2019 | Dickenson et al. |
| 2019/0238550 | A1 | 8/2019 | Zhang et al. |
| 2019/0268284 | A1* | 8/2019 | Karame ................ H04L 9/3236 |
| 2019/0280875 | A1 | 9/2019 | Ragnoni et al. |
| 2019/0289019 | A1 | 9/2019 | Thekadath et al. |
| 2021/0149883 | A1 | 5/2021 | Yu et al. |
| 2021/0243193 | A1 | 8/2021 | Padmanabhan |
| 2022/0019575 | A1 | 1/2022 | Qian |

FOREIGN PATENT DOCUMENTS

| | | |
|---|---|---|
| CN | 106911641 A | 6/2017 |
| CN | 106953838 A | 7/2017 |
| CN | 107113179 A | 8/2017 |
| CN | 109417465 A | 3/2019 |
| EP | 3200167 A1 | 8/2017 |
| EP | 3396576 A1 | 10/2018 |
| KR | 10-1661933 B1 | 10/2016 |
| KR | 10-1701131 B1 | 2/2017 |
| KR | 10-1723405 B1 | 4/2017 |
| KR | 10-1767534 B1 | 8/2017 |
| TW | 201732706 A | 9/2017 |
| WO | 2014/099688 A1 | 6/2014 |
| WO | 2015/187608 A1 | 12/2015 |
| WO | 2016/202952 A1 | 12/2016 |
| WO | 2017/054985 A1 | 4/2017 |
| WO | 2017/065389 A1 | 4/2017 |
| WO | 2017/079218 A1 | 5/2017 |
| WO | 2017/104899 A1 | 6/2017 |
| WO | 2017/107976 A1 | 6/2017 |
| WO | 2017/127564 A1 | 7/2017 |
| WO | 2017/131788 A1 | 8/2017 |
| WO | 2017/146333 A1 | 8/2017 |
| WO | 2018/113572 A1 | 6/2018 |

OTHER PUBLICATIONS

Extended European Search Report Received for EP Patent Application No. 17929402.0, dated Mar. 5, 2021, 8 pages.
Basic Attention Token, "Announcing a new Blockchain-Based Digital Advertising Platform", available online at <https://medium.com/@AttentionToken/announcing-a-new-blockchain-based-digital-advertising-platform-775203933c44>, Mar. 23, 2017, 4 pages.
Bitcoin Exchange Guide, "ATMChain—Smart Media Advertising Blockchain Network ICO?", available online at <https://bitcoinexchangeguide.com/atmchain/>, Aug. 16, 2017, 6 pages.
Blockchained Technology, "Data Storage with Blockchain Technology", available online at <http://blockchained.blogspot.in/2015/03/data-storage-with-blockchain-technology.html>, Mar. 17, 2015, 4 pages.
Ethereum, "When would it make sense to use node server for an application using smart contracts?", available online at <https://ethereum.stackexchange.com/questions/25830/when-would-it-make-sense-to-use-node-server-for-an-application-using-smart-contr>, Sep. 7, 2017, 4 pages.
Jai Singh Arun, "Reimagining the Future of Identity Management With Blockchain", available online at <https://securityintelligence.com/reimagining-the-future-of-identity-management-with-blockchain/>, Mar. 7, 2017, 6 pages.
Moinet et al., "Blockchain based trust & authentication for decentralized sensor networks", Jun. 6, 2017, pp. 1-6.
Peter Saint-Andre, "How can blockchains improve the Internet of Things?", available online at <https://coincenter.org/entry/how-can-blockchains-improve-the-internet-of-things>, Oct. 11, 2016, 8 pages.
Robert Hof, "How MetaX Plans To Use Blockchain To Stop Ad Fraud", available online at <https://www.forbes.com/sites/roberthof/2017/03/21/how-metax-plans-to-use-blockchain-to-stop-ad-fraud/#44088d01d59da>, Mar. 21, 2017, 2 pages.
Search Report and Written Opinion received for PCT Patent Application No. PCT/US2017/057554, dated Jul. 13, 2018, 14 pages.
Search Report and Written Opinion received for PCT Patent Application No. PCT/US2017/057556, dated Jul. 4, 2018, 8 pages.
Search Report and Written Opinion received for PCT Patent Application No. PCT/US2017/057558, dated Jul. 4, 2018, 9 pages.
Search Report and Written Opinion received for PCT Patent Application No. PCT/US2017/057560, dated Jul. 20, 2018, 12 pages.
Tran et al., "Regerator: a Registry Generator for Blockchain", CAiSE 2017 Forum and Doctoral Consortium Papers, 2017, pp. 81-88.
Kiviharju ("Enforcing Role-Based Access Control with Attribute-Based Cryptography in MLS Environments", Puolustusvoimien tutkimuslaitos, Jun. 13, 2017, 237 pages) (Year: 2017).

(56) References Cited

OTHER PUBLICATIONS

Christidis et al., "Blockchains and Smart Contracts for the Internet of Things", IEEE, 2016, pp. 2292-2303.
Kuo et al., "Blockchain distributed ledger technologies for biomedical and health care applications", Journal of the American Medical informatics Association, Sep. 8, 2017, pp. 1211-1220.
Lee et al., "Electronic Voting Service Using Block-Chain", JDFSL, 2016, 15 pages.
Shae et al., "On the Design of a Blockchain Platform for Clinical Trial and Precision Medicine", IEEE 37th International Conference on Distributed Computing Systems, 2017, pp. 1972-1980.

\* cited by examiner

PERMISSIONS FROM ENTITIES TO ACCESS INFORMATION

BACKGROUND

A storage system can store information for which requests can be submitted by client devices for access to the information. In some cases, access to the storage system can be granted by a server that manages access to the information in the storage system. Traditionally, an access control and/or policy management system determines whether a client device is allowed to access to requested information in the storage system.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A storage system can store information for which requests can be submitted by client devices for access to the information. In some cases, the information stored in the storage system can include data referenced by blocks of a blockchain. The storage system can include a distributed arrangement of storage nodes for storing respective pieces of information referenced by the blockchain blocks. In some cases, the distributed storage system can be operated by different entities. One type of distributed storage systems can be referred to as a swarm, which is used in Ethereum, one of the variants of blockchain deployment. Entities in the blockchain can dynamically upload information pertaining to transactions into the distributed storage systems, including when additional information cannot be stored in blockchain due to various constraints on the blockchain.

A blockchain refers to a distributed collection of records (referred to as "blocks") that are linked and secured cryptographically in a distributed manner. A blockchain can also refer to a continuous and unbroken ledger of blocks. The blocks of the blockchain can be distributed across a large number of computing devices. Each block can include various information, including transaction data for a transaction represented by the block, a timestamp, and a reference to a previous block in the blockchain. As new transactions occur, new blocks are created for the new transactions and added to the blockchain. A blockchain (which form a distributed transaction ledger) records transactions among multiple entities in a verifiable and permanent way. Once a block is created and the data of the block recorded, the block cannot be altered without alteration of subsequent blocks.

Multiple entities can see the transaction ledger, but because of the decentralized nature of the distributed collection of blocks the records are protected against hacking or corruption by a malicious entity. The validation of each block added to the blockchain is performed by every node by applying and/or validating hashing functions. If the validation fails, then that node drops the block from the blockchain.

A blockchain network includes "nodes" (referred to as blockchain nodes, full nodes, or blockchain full nodes) that can process requests to access the information.

In some cases, "owners" (also referred to as data owner entities) of information may lose control of which client entities can access that information once the information is put under management by a resource server of a distributed storage system. A client entity can refer to an entity that is associated with a client device. A client entity can refer to any of the following: the client device itself, a user of the client device, a program or component in the client device, and so forth.

If the resource server is able to grant access to the information in the distributed storage system without first consulting with the owners of the information, then unauthorized entities may potentially be able to access the information in the distributed storage system. Moreover, the distributed storage system may contain different categories of information that can be associated with different privilege levels relating to which client entities can access the different categories of information.

In accordance with some implementations of the present disclosure, techniques or mechanisms are provided to allow owners of information stored in a distributed storage system (or multiple distributed storage systems) to specify authorization requirements to access the information. An authorization requirement can indicate that authorization tokens have to be first obtained from the owners of the corresponding information before the corresponding information can be shared with a client entity. In some cases, an authorization requirement can specify that different categories of information have different privilege levels for which different authorizations are to be obtained. An authorization requirement can specify different types of requirements for approval of information access, such as based on a client entity being part of a predefined group, the client entity having certain knowledge, the client entity having made payment for accessing information, the information accessed being approved by a contract, and so forth.

Figure 1:
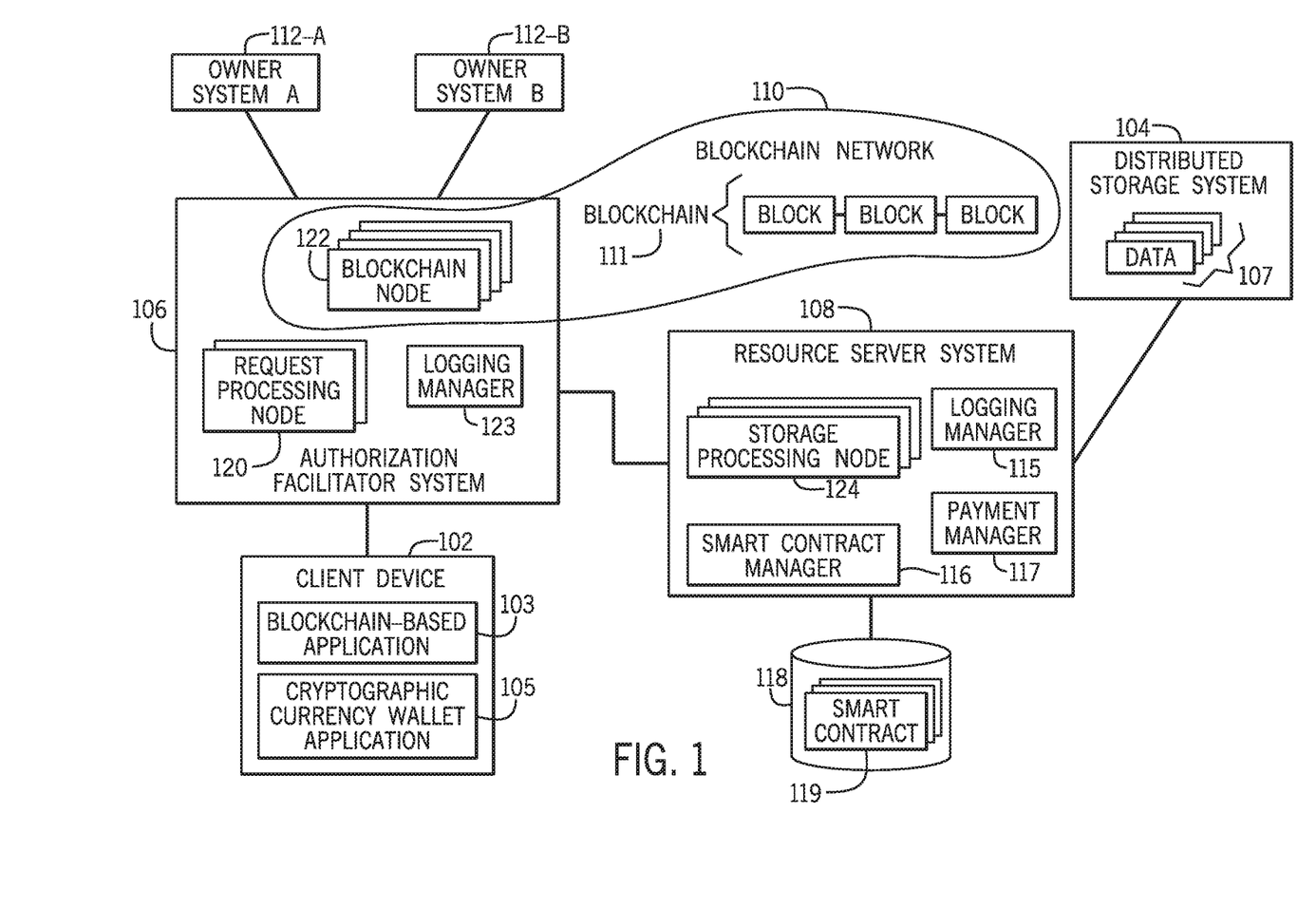
FIG. 1 is a block diagram of an arrangement according to some examples.

FIG. 1 is a block diagram of an example arrangement that includes a client device 102 that is able to send a request to access information stored in a distributed storage system 104, an authorization facilitator system 106, and a resource server system 108. Although just one client device 102 is shown in FIG. 1, it is noted that in other examples, multiple client devices 102 can be present, where the multiple client devices 102 can submit requests to access data in the distributed storage system 104. Also, there can be multiple distributed storage systems 104, and/or multiple authorization facilitator systems 106, and/or multiple resource server systems 108.

The client device 102 can include any type of computing device that is able to communicate over a network and to submit a request for information. Examples of the client device 102 can include any or some combination of the following: a smartphone, a tablet computer, a notebook computer, a desktop computer, a wearable device (e.g., smart eyeglasses, a head-mounted electronic device, a smart watch, etc.), a game appliance, a home appliance, a vehicle, or any other type of electronic device.

The client device 102 can include a blockchain-based application 103 that interacts with the authorization facilitator system 106 to request information referred to by a blockchain 111 stored in a blockchain network 110. The request for information can seek information in the distributed storage system 104 that can be associated with an authorization requirement where permissions have to be obtained from owners of the requested information. The client device 102 can also include a cryptographic currency wallet application 105, which can be used to make payment for a transaction or to make payment for accessing data or to make payment for any other purpose.

The distributed storage system 104 stores data 107 that is referenced by blocks of the blockchain 111. In examples shown according to FIG. 1, instead of storing actual data in the blocks of the blockchain 111, data is stored in the distributed storage system 104. The distributed storage system 104 can be implemented with a distributed arrangement of storage nodes that store the data 107 in a distributed manner.

Each piece of data 107 in the distributed storage system 104 can have an owner, or alternately, can have multiple owners. An owner of a piece of data can refer to an entity (such as a user, an organization, a machine, a program, etc.) that is able to grant permission to access the piece of data. A "piece of data" can refer to any unit of data that can be separately identifiable, such as a file, an object, a chunk, and so forth.

The authorization facilitator system 106 (implemented as a distributed arrangement of computing nodes) interacts with client devices (including the client device 102), the blockchain network 110, and owner systems 112-A and 112-B, to allow the client devices to obtain authorization to access information in the distributed storage system 104.

The owner systems 112-A and 112-B are associated with respective owners of information that can be stored in the distributed storage system 104. Although just two owner systems 112-A and 112-B are shown in FIG. 1, it is noted that in other examples, there can be more than two owner systems associated with respective owners. Each owner system can be implemented as a single computing node or a distributed arrangement of computing nodes.

The resource server system 108 (implemented as a distributed arrangement of computing nodes) manages access to the information stored in the distributed storage system 104, including the data 107. Depending upon an authorization requirement for a requested information sought by a request of the client device 102, the resource server system 108 can inform the authorization facilitator system 106 (and possibly the client device 102) that permissions have to first be obtained from owners of the requested information before the client device 102 is able to be granted access to the requested information. In such cases, the resource server system 108 does not make the determination of whether the client device 102 has permission to access the requested information. Rather, the resource service system 108 can provide identities of the owners, and it is the responsibility of the client device 102 and/or the authorization facilitator system 106 to obtain the permissions from the owners.

The computing nodes of the authorization facilitator system 106 include request processing nodes 120 and blockchain nodes 122. In other examples, the blockchain nodes 122 can be part of another system separate from the authorization facilitator system 106. The blockchain nodes 122 are part of the blockchain network 110.

The request processing nodes 120 are able to interact with corresponding client devices 102, to receive requests from the client devices 102 and to send response information (responsive to the requests) to the client devices 102. The request processing nodes 120 can also interact with the owner systems 112-A and 112-B to seek permissions for client entity access of information in the distributed storage system 104.

The blockchain nodes 122 store all blocks of the blockchain 111 and perform processing relating to the blocks of the blockchain 111. The blockchain nodes 122 are able to provide distributed processing for granting access in response to requests from client devices 102.

The computing nodes of the resource server system 108 include storage processing nodes 124 that are able to manage access of the distributed storage nodes of the distributed storage system 104.

An authorization requirement for requested information (as requested by the client device 102) can specify that permissions from owners have to first be obtained before access is granted to the requested information. In further examples, different pieces of information can be associated with different privilege levels. For example, the different pieces of information can include different categories of information. As an example, in a hospital, the different categories of information can include the following: a first category of information that includes information of a patient of the hospital, a second category of information that includes information of a pharmacy in the hospital, a third category of information that includes information that includes information of lab results obtained by testing done by the hospital, a fourth category of information that is associated with equipment in the hospital, and so forth. In other contexts, there can be other categories of information. Each category of information is associated with a corresponding privilege level. For example, for first privilege level, the owners of the respective piece of information may determine that certain client devices are allowed access, while other client devices are not allowed access. For a second privilege level, the owners can determine that more classes of client entities are allowed access to the given piece of information.

As further shown in FIG. 1, the resource server system 108 includes a smart contract manager 116. The smart contract manager 116 can be implemented as a single computing node or as a distributed arrangement of computing nodes. The smart contract manager 116 has access to a smart contract database 118 that contains smart contracts 119.

A smart contract 119 provides logic and rules executed by computing device(s) for a blockchain to automate terms of a contract among multiple entities. A smart contract can include blockchain addresses of the parties of the smart contract, information relating to terms of the smart contract, and other information. A smart contract can be established among multiple entities. A smart contract manager implements enforcement of smart contracts.

A blockchain address refers to an identifier. In some examples, a blockchain address is analogous to an account number. An entity (such as a user or a device) can include one blockchain address, or can have multiple blockchain addresses. In some examples, a blockchain address can be generated based on use of a pair of keys including a public key and a private key associated with an entity.

In response to a request from the client device 102 to access information in the distributed storage system 104, the smart contract manager 116 can access a selected smart contract of the smart contracts 119 in the smart contract database 118. Based on the selected smart contract, the smart contract manager 116 is able to determine the authorization requirement (if any) for access of requested information.

In some cases, the authorization requirement for particular information in the distributed storage system 104 can indicate that permissions from owners of the particular information do not have to be first obtained before access is granted to the particular information. In such cases, the resource server system 108 can grant access to the particular information to the client device 102 without indicating that permissions from the owners have to first be obtained.

In other cases, the authorization requirement for particular information in the distributed storage system 104 can indicate that permissions from owners of the particular information have to be first obtained before access is granted to the particular information. In such cases, the resource server system 108 can interact with the authorization facilitator system 106 and/or the client device 102 to cause the authorization facilitator system 106 and/or the client device 102 to obtain permissions from the owners of the particular information.

In some examples, as pieces of information are written to the distributed storage system 104 by owners of the pieces of information, the pieces of information can be tagged with identification information (in tags) that identifies the owners of the pieces of information, and privilege information indication the privilege levels required to access the respective pieces of information. In alternate examples, the determination of owners of pieces of information can be based on which entities digitally signed the pieces of information for storage in the distributed storage system 104. Digitally signing a piece of information refers to an entity encrypting the piece of information with a private key of the entity, such as according to a Public Key Infrastructure (PKI) digital signing.

Multiple parties may be owners with differing levels of privilege levels for the same piece of information. In such cases, the multiple owners can sign the piece of information. In some examples, all ownership-related signing and privilege level-related tagging have to be done while storing the information. With such tagging or association of ownership and privilege levels with pieces of information, the resource server system 108 and the distributed storage system 104 are guardians of the information, with the ability to grant permission for access controlled by the owners.

The authorization requirements (e.g., the conditions or rules governing access) to access respective pieces of information can be stored in smart contracts (119) managed by the smart contract manager 116. Privilege levels and multiparty ownership information are available to the smart contract manager 116. The smart contract manager 116 can create smart contracts for processing in the future.

In some examples, the authorization facilitator system 106 includes a logging manager 123 that logs access of certain piece of information in the distributed storage system 104 by a client entity after authorization by respective owners. The log of the transaction can also be made part of the blockchain 111, or alternately, as part of the blockchain 111 and log information stored in the distributed storage system 104.

The resource server system 108 can also include a logging manager 115 to log similar information as the logging manager 123.

In further examples, the resource server system 108 includes a payment manager 117, which can be implemented as a single computing node or a distributed arrangement of computing nodes. The payment manager 117 can collect payment from the client entity as part of providing the requested information to the client device 102. The payment manager 117 can interact with the cryptographic current wallet application 105 of the client device 102 to collect the payment. Additionally, the payment manager 117 can also collect payment from a given owner of information in response to storing the information owned by the given owner with multiparty ownership and privilege levels in the distributed storage system 104.

Figure 2:
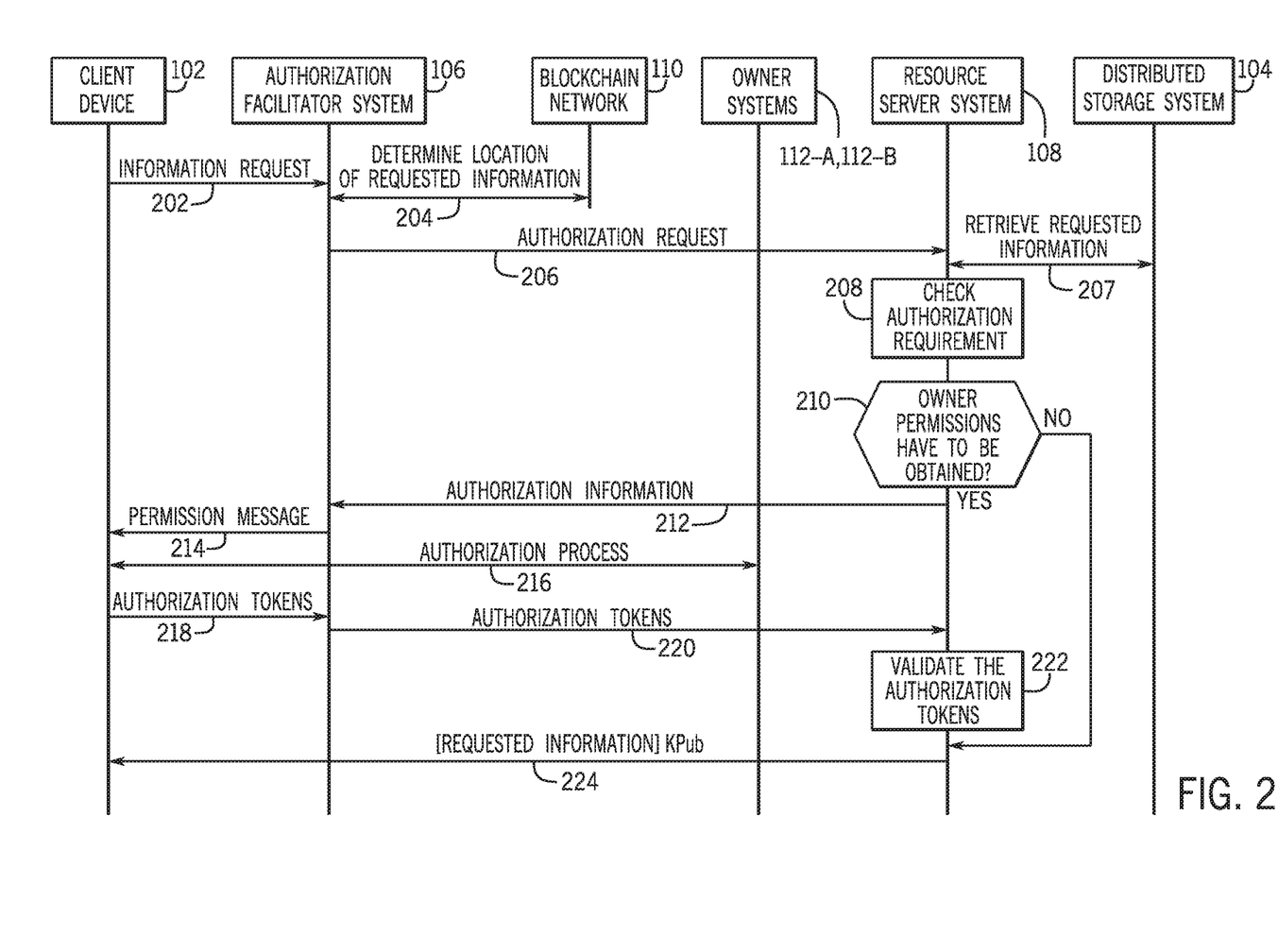
FIG. 2 is a message flow diagram of a process according to some examples.

FIG. 2 is a message flow diagram of a process involving components shown in FIG. 1, according to some examples. The client device 102 sends an information request (at 202) to the authorization facilitator system 106, to request information stored in the distributed storage system 104. The information stored in the distributed storage system 104 includes data 107 referenced by respective blocks of the blockchain 111.

The information request submitted by the client device 102 can include a blockchain address of an entity, which can be any of the following: a product, a machine, a program, a human user, or any other type of entity. The entity identified by the blockchain address can be associated with corresponding transactions that are represented by the blocks of the blockchain 111. Thus, the blockchain address included in the information request can relate to specific transaction information of the blockchain. In the present disclosure, "transaction information" can refer to information of a single transaction or information of multiple transactions.

In response to the information request, the authorization facilitator system 106 (and more specifically, the blockchain full nodes 122 of FIG. 1) is able to check with the blockchain network 110 to determine (at 204) a location of the requested information. A "location" of the requested information can refer to a geographic location, a storage system, a resource server system that manages access of a system that includes the requested information, or any other indication of what entity the authorization facilitator system 106 is to interact with to obtain access to the requested information.

Using the blockchain address specified by the information request, the blockchain network 110 can respond with location information for the requested information. There are a number of different techniques for locating and gathering information from the distributed storage system 104. Some of the techniques can include retrieving content using a Hypertext Transfer Protocol (HTTP), a proxy scheme, Ethereum's bzz scheme, a Uniform Resource Locator (URL) scheme, path matching on manifests, an Ethereum Name Service, and so forth. The Ethereum Name Service is similar to Domain Name System (DNS) in the Internet world. Distributed database service providers can register for a .eth domain as well, to allow for a distributed storage system of each distributed database service provider to be located. For other examples, the location information can include an IP address that serves as an identifier corresponding to the location of the resource server system 108 that the authorization facilitator system 106 is to contact to obtain access of the requested information. In another example, an identifier corresponding to the location of the server could be extracted from a location services application that calculates the position in physical space, uses a radio frequency identification (RFID) tag, calculates position from a Global Positioning Satellite (GPS) service, or some other method of establishing location.

Based on the location information, the authorization facilitator system 106 (e.g., one of the request processing nodes 120 of FIG. 1) sends an authorization request (at 206) to the resource server system 108. The authorization request provides an indication to the resource server system 108 that the client device 102 is seeking access to the requested information, and that authorization information is being sought to determine how to obtain authorization (if any) to access the requested information.

In response to the authorization request, storage processing node(s) of the resource server system 108 retrieves (at 207) the requested information from the distributed storage system 104.

The smart contract manager 116 of the resource server system 108 checks (at 208) an authorization requirement relating to the requested information. In some examples, the authorization requirement may have been registered by owners of the requested information, or may have been registered by the resource server system 108. The authorization requirement can be included as a term of a smart contract (119 in FIG. 1) in some examples. Thus, the smart contract manager 116 can check the relevant smart contract to determine the authorization requirement for the requested information.

Based on the authorization requirement, the resource server system 108 determines (at 210) whether owner permissions have to be obtained to grant access to the requested information. If owner permissions have to be obtained, the smart contract manager 116 can obtain the identities of the owners of the requested information (such as from the tags associated with the pieces of the requested information retrieved from the distributed storage system 104), and can send authorization information (at 212) to the authorization facilitator system 106.

The authorization information 212 can include identities of the owners of the requested information from which permissions are to be obtained to grant access to the requested information. In some examples, the authorization information 212 can also include a privilege level (or multiple privilege levels) associated with the requested information. The privilege level(s) can also be obtained from the tags associated with the pieces of the requested information retrieved from the distributed storage system 104. The authorization information 212 can specify the authorization requirement for each privilege level. For example, if the requested information includes multiple pieces of information associated with different privilege levels, the authorization information 212 can include multiple privilege levels, and authorization requirements for each of the multiple privilege levels. The authorization information 212 is delivered to the authorization facilitator system 106, and possibly also to the client device 102. In other examples, the authorization information 212 is sent to the authorization facilitator system 106, which in turn can either process the authorization information 212 itself or can forward the authorization information 212 to the client device 102.

In examples where the authorization information 212 is sent to the authorization facilitator system 106, the authorization facilitator system 106 (such as one of the request processing nodes 120) can cause the client device 102 to obtain permissions from the identified owners (as identified by the authorization information 212). For example, the authorization facilitator system 106 can send a permission message (at 214) to the client device 102, where the permission message is to cause a client entity associated with the client device 102 to seek permissions from the identified owners.

In response to the permission message 214, the client device 102 performs an authorization process (at 216) with the owner systems 112-A and 112-B (assuming that the owner systems 112-A and 112-B are systems associated with the identified owners in the authorization information 212). In some examples, the authorization process (at 216) can be performed in response to the client entity (e.g., user, program, etc.) associated with the client device 102 indicating that the authorization process is to be performed.

In some examples, the authorization process (at 216) is according to the OAuth protocol, which is a standard for access delegation, to allow the owners of pieces of information to grant other entities, such as the distributed storage system 104, access to the pieces of information owned by the owners, but without giving the other entities the authorization tokens that are to be used for access to such pieces of information. Although reference is made to the OAuth protocol, it is noted that in other examples, other types of protocols where an owner can delegate access to information owned by the owner to another party can be used.

As part of the authorization process 216, and assuming that the owner systems 112-A and 112-B have granted permissions to the client entity associated with the client device 102 access of the requested information, the owner systems 112-A and 112-B sends back authorization tokens to the client device 102. As used here, an "authorization token" (also referred to an "access token") includes a credential (such as a password, an encryption key, or any other access information that can be used to obtain access of a particular piece of information).

In some examples, an authorization token is a context-based authorization tokens that restricts access based on context, as represented by one or some combination of the following context parameters: a specified time and date range, a location, an identity of a client entity, or other contextual parameter.

The context-based authorization token can specify a specific context for access, and any request received outside the specific context can be rejected by the resource server system 108.

The client device 102 sends the received authorization tokens (at 218) to the authorization facilitator system 106. In response to receiving the authorization tokens from the client device 102, the authorization facilitator system 106 (such as one of the request processing nodes 120) sends the authorization tokens (at 220) to the resource server system 108.

In other examples, the client device 102 can send the authorization tokens directly to the resource server system 108 (without first forwarding to the authorization facilitator system 106).

The resource server system 108 (and more specifically the smart contract manager 116) validates (at 222) the received authorization tokens. The validation can be based on access of the relevant smart contract by the smart contract manager 116 of the resource server system 108. Validating an authorization token can refer to confirming that the authorization token contains the correct access information (e.g., correct password, correct biometric data such as a voice- or fingerprint, correct encryption key, correct digital signature, etc.) that can be used to obtain access to the requested information.

Assuming that the authorization tokens are validated, the requested information is transmitted (at 224) to the client device 102. In some examples, the requested information is encrypted using a public key of the client entity associated with the client device 102, where this public key is represented by KPub in FIG. 2. Encrypting the requested information with the public key of the client entity ensures that only the client entity is able to see the requested information, by decrypting the encrypted request information using a private key of the client entity. Unauthorized entities, such as sniffers, would not be able to observe the requested information.

As noted above, the resource server system 108 determines (at 210) whether permissions have to be obtained from owners to access the requested information. The foregoing explains a case where permissions have to be first obtained from the owners. However, if the resource server system 108 (and more specifically, the smart contract manager 116) determines (at 210) from the authorization requirement that permissions do not have to be obtained from the owners of the requested information, then the resource server system 108 can send the requested information (at 224) in encrypted form to the client device 102, without performing tasks 212, 214, 216, 218, 220, and 222.

Figure 3:
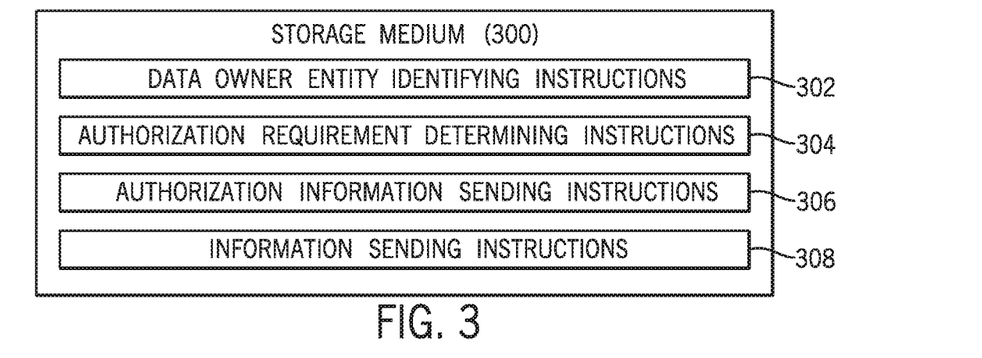
FIG. 3 is a block diagram of a storage medium storing machine-readable instructions according to other examples.

FIG. 3 is a block diagram of a non-transitory machine-readable or computer-readable storage medium 300 storing machine-readable instructions that upon execution cause a system to perform various tasks. The machine-readable instructions include instructions 302 and 304 that are executed in response to a request from a client device for information relating to a transaction stored by a blockchain. The instructions 302 are data owner entity identifying instructions to identify, using information stored in a distributed storage system that stores data for the blockchain, multiple data owner entities from which permissions are to be obtained for access of the information. The instructions 304 are authorization requirement determining instructions to determine an authorization requirement for the information based on a smart contract.

The machine-readable instructions further include authorization information sending instructions 306 to send authorization information based on the authorization requirement to trigger a retrieval of authorization tokens from the identified data owner entities for access of the information. The machine-readable instructions additionally include information sending instructions 308 to send the information to the client device in response to receiving the authorization tokens.

Figure 4:
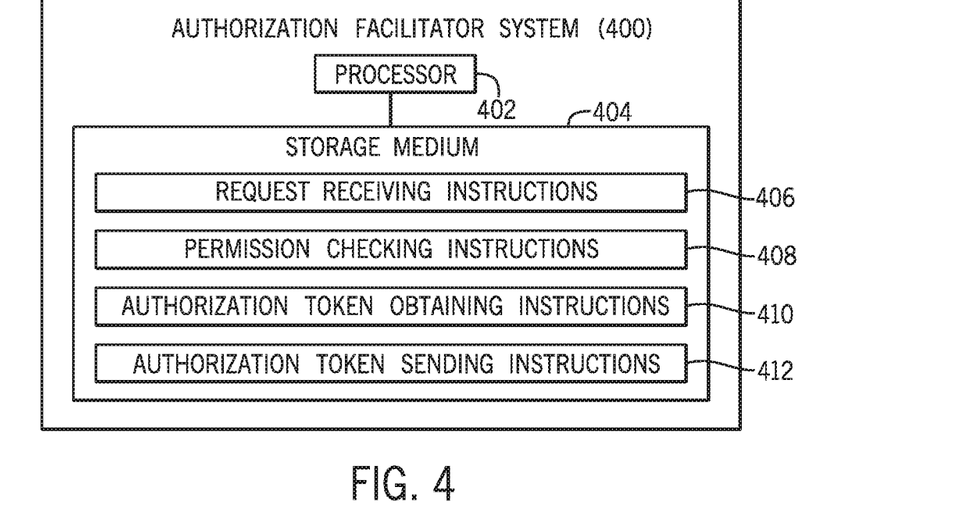
FIG. 4 is a block diagram of an authorization facilitator system according to further examples.

FIG. 4 is a block diagram of an authorization facilitator system 400 that includes a processor 402 and a non-transitory storage medium 404 storing machine-readable instructions executable on the processor 402 to perform various tasks. Machine-readable instructions executable on a processor can refer to machine-readable instructions executable on one processor or on multiple processors. A processor can include a microprocessor, a core of a multi-core microprocessor, a microcontroller, a programmable integrated circuit, a programmable gate array, or another hardware processing circuit.

The machine-readable instructions include request receiving instructions 406 to receive a request from a client device for information relating to a transaction stored by a blockchain. The machine-readable instructions further include permission checking instructions 408 to, in response to the request, check with a resource server system to identify, using a smart contract, entities from which permissions are to be obtained for access of the information.

The machine-readable instructions additionally include authorization token obtaining instructions 410 to, in response to the checking, cause the client device to obtain authorization tokens from the identified entities for access of the information. The machine-readable instructions also include authorization token sending instructions 412 to send the authorization tokens to the resource server system to cause the resource server system to send the information in response to the resource server validating the authorization tokens.

Figure 5:
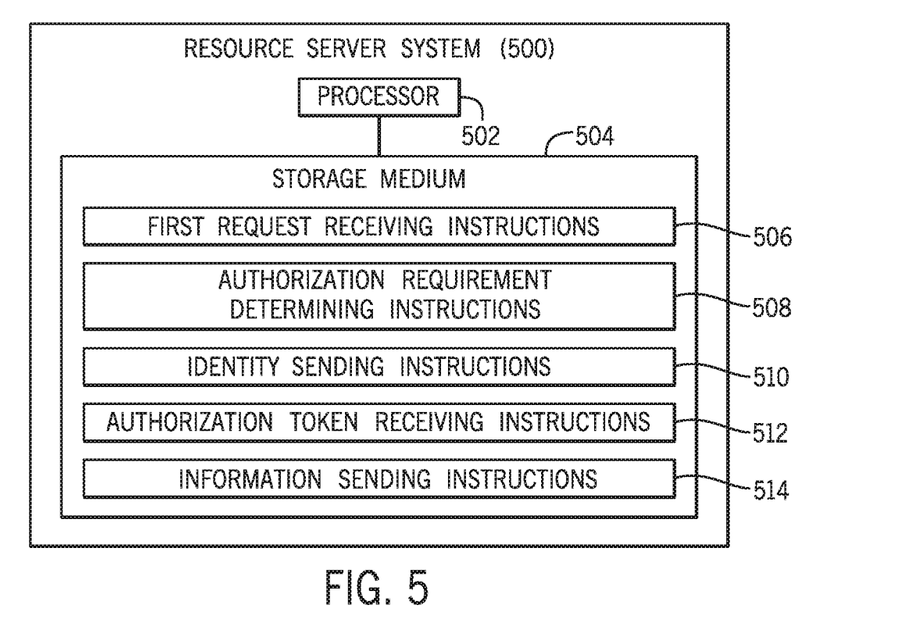
FIG. 5 is a block diagram of a resource server system according to additional examples.

FIG. 5 is a block diagram of a resource server system 500 including a processor 502 and a non-transitory storage medium 504 storing machine-readable instructions executable on the processor 502 to perform various tasks. The machine-readable instructions include first request receiving instructions 506 to receive, from an authorization facilitator system, a first request seeking access to information relating to a transaction stored by a blockchain, the first request sent by the authorization facilitator system in response to the authorization facilitator system receiving a second request seeking access to the information from a client device. The machine-readable instructions further include authorization requirement determining instructions 508 to determine an authorization requirement specified by entities that are owners of the information.

The machine-readable instructions additionally include identity sending instructions 510 to, based on the authorization requirement, send identities of the entities to the authorization facilitator system. The machine-readable instructions also include authorization token receiving instructions 512 to receive authorization tokens obtained from the entities in response to the identities of the entities sent to the authorization facilitator system, and information sending instructions 514 to, in response to validating the authorization tokens, send the information for receipt by the client device.

The storage medium 300 (FIG. 3), 404 (FIG. 4), or 504 (FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Storage can be located on premise, off premise, at a managed service provider, in a private or public cloud, or any combination thereof.

Note that the instructions discussed above can be provided on one computer-readable or machine-readable storage medium, or alternately, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
in response to a request from a client device for information relating to a transaction stored by a blockchain,
identify, using information stored in a distributed storage system that stores data for the blockchain, multiple data owner entities from which permissions are to be obtained for access of the information, and
determine an authorization requirement for the information based on a smart contract;
identify a privilege level of a plurality of privilege levels for which the permissions are to be obtained;
send authorization information based on the authorization requirement to trigger a retrieval of authorization tokens from the identified data owner entities for access of the information, wherein the authorization tokens are for the identified privilege level; and
send the information to the client device in response to receiving the authorization tokens.

2. The non-transitory machine-readable storage medium of claim 1, wherein the instructions upon execution cause the system to:
receive the authorization tokens from the identified data owner entities for access of the information; and
validate the authorization tokens,
wherein sending the information to the client device is in response to validating the authorization tokens.

3. The non-transitory machine-readable storage medium of claim 1, wherein the instructions upon execution cause the system to further:
in response to the request from the client device, access the blockchain to determine a location where the information is stored; and
check with a resource server associated with the location to request identities of the data owner entities from which permissions are to be obtained for access of the information.

4. The non-transitory machine-readable storage medium of claim 1, wherein identification of the data owner entities is based on determining which data owner entities digitally signed the information in the distributed storage system that stores respective information for blocks of the blockchain.

5. The non-transitory machine-readable storage medium of claim 1, wherein the authorization requirement specifies that the permissions are to be obtained from the data owner entities before access of the information is granted to the client device.

6. The non-transitory machine-readable storage medium of claim 5, wherein the smart contract specifies that access to information relating to a further transaction stored by the blockchain can be granted without first seeking permissions of data owner entities owning the information relating to the further transaction.

7. The non-transitory machine-readable storage medium of claim 1, wherein identification of the data owner entities is based on tags associated with the information in the distributed storage system.

8. The non-transitory machine-readable storage medium of claim 1, wherein identifying the privilege level is based on tags associated with information in the distributed storage system.

9. The non-transitory machine-readable storage medium of claim 1, wherein the retrieval of the authorization tokens from the data owner entities is according to an authorization protocol that allows the data owner entities to delegate access to information owned by the data owner entities to another party.

10. The non-transitory machine-readable storage medium of claim 1, wherein the instructions upon execution cause the system to further:
encrypt the information with a public key of the client device in response to validating the authorization tokens,
wherein the sending of the information to the client device comprises sending the encrypted information.

11. The non-transitory machine-readable storage medium of claim 1, wherein the authorization tokens comprise context-based authorization tokens that restrict access according to any or a combination of the following contextual parameters: a specified time and date range, a location, or an identity of a client entity.

12. The non-transitory machine-readable storage medium of claim 1, wherein the information relating to the transaction is stored in the distributed storage system encrypted with private keys of the entities, the distributed storage system storing respective information for blocks of the blockchain.

13. The non-transitory machine-readable storage medium of claim 1, wherein the instructions upon execution cause the system to further:
collect payment from the client device as part of sending the information to the client device, the collecting of the payment based on interaction with a wallet application in the client device.

14. The non-transitory machine-readable storage medium of claim 1, wherein the instructions upon execution cause the system to further:
collect payment from a given data owner entity in response to storing information owned by the given data owner entity with multiparty ownership and privilege levels in a distributed storage system.

15. The non-transitory machine-readable storage medium of claim 1, wherein the instructions upon execution cause the system to log access of a piece of information in the distributed storage system by a client entity after authorization by respective data owner entities.

16. A resource server system comprising:
a processor; and
a non-transitory storage medium storing instructions executable on the processor to:
receive, from an authorization facilitator system, a first request seeking access to information relating to a transaction stored by a blockchain, the first request sent by the authorization facilitator system in response to the authorization facilitator system receiving a second request seeking access to the information from a client device;
determine an authorization requirement specified by entities that are owners of the information, wherein the authorization requirement is specified in a smart contract, and the authorization requirement identifies a plurality of levels of authorizations to be obtained for different categories of information;

based on the authorization requirement, send identities of the entities to the authorization facilitator system;

send, to the authorization facilitator system, authorization information for the plurality of levels of authorizations;

receive authorization tokens obtained from the entities in response to the identities of the entities sent to the authorization facilitator system, the authorization tokens indicating permissions granted by the entities; and in response to validating the authorization tokens, send the information for receipt by the client device.

17. The resource server system of claim 16, wherein the determining of the authorization requirement is based on a smart contract, and the determining of the entities is based on multiparty signing of tags associated with information in a distributed storage system.

18. A method comprising:

in response to a request from a client device for information relating to a transaction stored by a blockchain, identifying, using information stored in a distributed storage system that stores data for the blockchain, multiple data owner entities from which permissions are to be obtained for access of the information, and determining an authorization requirement for the information based on a smart contract;

identifying a privilege level of a plurality of privilege levels for which the permissions are to be obtained;

sending authorization information based on the authorization requirement to trigger a retrieval of authorization tokens from the identified data owner entities for access of the information, wherein the authorization tokens are for the identified privilege level; and sending the information to the client device in response to receiving the authorization tokens.

19. The method of claim 18, further comprising:

receiving the authorization tokens from the identified data owner entities for access of the information; and validating the authorization tokens, wherein sending the information to the client device is in response to validating the authorization tokens.

20. The method of claim 18, further comprising:

in response to the request from the client device, accessing the blockchain to determine a location where the information is stored; and checking with a resource server associated with the location to request identities of the data owner entities from which permissions are to be obtained for access of the information.

21. The method of claim 18, wherein identification of the data owner entities is based on determining which data owner entities digitally signed the information in the distributed storage system that stores respective information for blocks of the blockchain.

* * * * *